July 28, 1936.  W. G. H. FINCH  2,049,169
SHEET MOUNTING MECHANISM
Original Filed Feb. 26, 1936
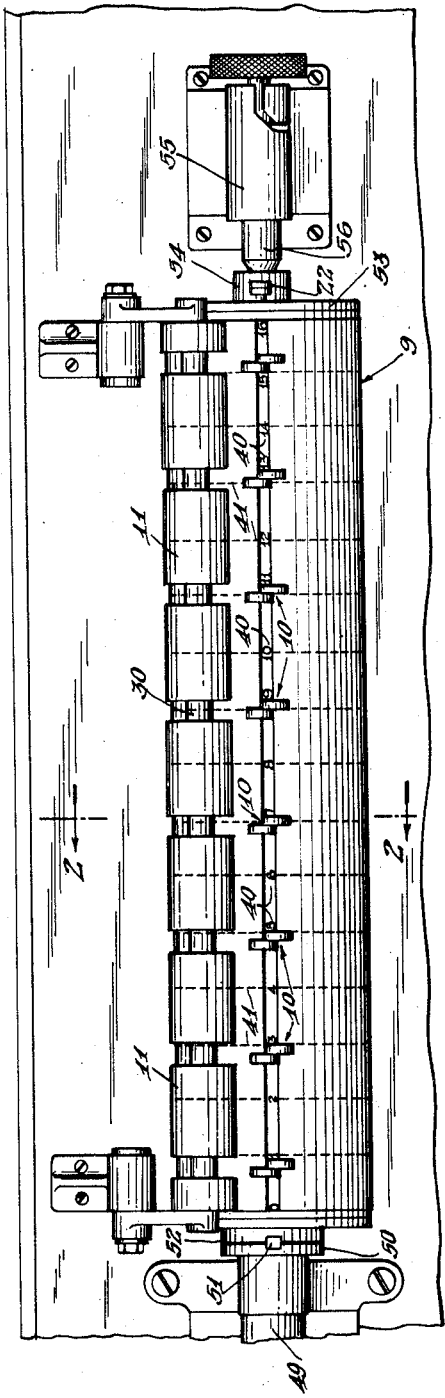
INVENTOR.
William G. H. Finch
BY
Samuel Ostrolenk
His ATTORNEY.

Patented July 28, 1936

2,049,169

UNITED STATES PATENT OFFICE 2,049,169

SHEET MOUNTING MECHANISM

William G. H. Finch, New York, N. Y.

Original application February 26, 1936, Serial No. 65,869. Divided and this application March 18, 1936, Serial No. 69,596

8 Claims. (Cl. 178—13)

My invention relates to novel apparatus for telecommunication systems and more particularly relates to a novel construction of a drum for mounting a picture film and novel methods of mounting the same.

Telepicture systems are generally of the drum or continuous sheet type. In a drum system, the record sheet is mounted upon a cylinder or drum for scanning at the transmitter and receiver stations. Various means have heretofore been employed for mounting the sheet upon the drum. The pictures to be transmitted were reduced or enlarged to the size necessary for mounting upon the particular size of picture drum.

I contemplate mounting picture sheets of different sizes upon a drum which has a plurality of novel film clamping means disposed along its length. Where large picture drums are used for correspondingly large picture sheets, difficulties are encountered in rapidly and smoothly mounting the picture sheets. I provide a novel presser roller mechanism for overcoming these difficulties in mounting large record sheets on large picture drums.

Accordingly, an object of my invention is to provide a novel picture drum and novel methods of mounting picture films thereon.

A further object of my invention is to provide novel clamping mechanisms for securing the picture to the drum.

Still a further object of my invention is to provide novel methods of and means for insuring a smooth, closely adhering application of the picture film to the drum.

Still a further object of my invention is to provide a novel picture drum which will directly indicate the size of the picture to be transmitted or apprise the operator of the length of the portion of a picture scanned.

There are other objects of my invention together with the foregoing which will appear in the detailed description of my invention made in connection with the drawing, in which:

Figure 1 is a plan view of a preferred form of my novel drum;

Figure 2 is a cross-sectional view through 2—2 of Figure 1 of the picture drum showing details of my novel film clamping mechanism; and Figure 3 is a partial perspective view of the film clamping mechanism.

Referring now specifically to the drawing, I disclose in this application which is a division of my application Serial No. 65,869 filed February 26, 1936, a plurality of film clamp members 10 disposed along one section of the circumference of the picture drum 9 for engaging opposite ends of the picture sheet to be transmitted. Figure 2 is a cross-sectional illustration of the film clamp assembly 10 and the rollers 11.

A picture sheet 12 is placed upon the picture drum 9 in the following manner: The coacting film clamps 13 and 14 have two portions 15 and 16 for clamping the corresponding opposite ends 17 and 18 of the picture sheet 12. A cam 20 operates upon each film clamping assembly 10. The cam members 20 are mounted on a common cam shaft 21 at one end of which is attached a lever 22. The coacting film clamps 13 and 14 are riveted together at the pivots 23. The ends 24 and 25 of the clamps 13 and 14 are elastically fastened by spring 26. The normal position of the clamps 13 and 14 is such that their toothed portions 15 and 16 grip against the surface plate 8 of the drum 9 or grip into the corresponding ends 17 and 18 of the picture sheet 12. It is to be understood that the clamping mechanism 10 illustrated in Figure 1 is duplicated in the plurality of clamping members 10 which are employed along the picture drum as illustrated in Figure 1.

In order to insert one end 17 of the record sheet 12 under the toothed portions 15 of the film clamp members 13, the lever 22 is moved so that the cam 20 presses against the arm of the member 13. The toothed portion 15 of clamp 13 is accordingly raised from the drum surface 8 permitting the edge 17 of the sheet 12 to be inserted thereunder. It is to be understood that this edge 17 is inserted under corresponding toothed portions 15 of clamping mechanisms 10. The lever 22 is returned to its normal position and the clamp teeth 15 grip the sheet 12 firmly to the drum surface 8 along the sheet edge 17.

The rollers 11 are moved into engagement with the drum 9 to firmly and evenly apply pressure upon the film 12 along the drum 9. The plurality of rollers 11 are illustrated pressing upon the drum in Figure 1. The dotted position 7 indicates the position of the rollers 11 out of operative relation with the drum 9. The rollers are preferably solid metal cylinders, rotatably mounted on a common shaft 30. Collars 31 are used to separate them. A rubber or other suitable surfacing 32 is placed on the rollers 11 to protect the film or record sheet 12.

Figure 2 illustrates how the rollers 11 are used to facilitate proper mounting of record sheet 12 upon the drum 13 after one end 17 of the sheet 12 is gripped in position by the clamp members 13. The rollers 11 are pressed down near the sheet end 17 and the drum 13 is slowly rotated manually. The film 12 is accordingly firmly pressed in position around the drum 13. The opposite sheet end 18 is gripped under the teeth 16 of clamp 14 by operation of the lever 22 and cam members 20 as will now be understood.

The film clamping arrangement according to my invention provides the gripping of any length of picture for transmission. The drum has a circumference of 11 inches, and in my preferred embodiment, is 17 inches long. Standard 10" by 14" pictures are readily accommodated on such a drum. The only size requirement is that one dimension of the sheet 12 should be such as to fit onto the drum 9 to be securely clamped in position by the clamping mechanism 10, the rollers 11 assisting in smoothly mounting the picture 12.

I also provide a scale 40 which is marked along "dead" or underlap portion of the drum, namely that portion containing the clamping members 10 for the "dead" ends 17—18 of the picture sheet 12. Small circumferential grooves 41 are made in the surface 9 of the drum 8 corresponding to integral marked spacings of the scale 40. The distance between these grooves or scale markings 41 is preferably one inch. The operator is readily apprised of the size of a picture mounted for transmission, or of the length of a portion picture already scanned during its transmission.

Although in connection with my novel clamping mechanisms I may employ any desired drive connection and support for the drum I have for the purpose of illustration here illustrated the mounting of the drum as shown in the parent application Serial No. 65,869 supra. Rotative power is supplied to the spindle 49 extending from a suitable drive connection (not shown) in any well known manner. Rigidly connected and rotatable with the spindle 49 is a face plate driver 50. A key or projection 51 on the face of the driver 50 sets into a corresponding groove into flange 52 of the receiver drum 9. The opposite end of the drum 9 is provided with a flange 53 which contains the corresponding end of the drum shaft 54. A supporting member 55 contains conical or pointed spindle 56 which projects into a cavity in the shaft 54 end. The drum is accordingly rotatably supported and driven by the shaft 49.

It is to be understood that the sheet mounting mechanism may be used in connection with a telepicture transmitter or receiver. In a transmitter, a beam of light is focused upon a picture sheet mounted on the drum. The drum is rotated at a constant rate, while the scanning mechanism moves along the drum parallel to its axis. The light beam is refracted from the picture sheet to impinge upon a photoelectric cell for producing corresponding telepicture signals. In a receiver, a light sensitive film is mounted upon the drum and a light beam with intensity varying in accordance with the received telepicture signals is scanned across the sensitive film to reproduce the transmitted picture thereon.

Although for the purpose of illustration I have shown preferred forms of my invention it will be obvious to those skilled in the art that it may take other forms, and I do not intend to be limited except as set forth in the appended claims.

I claim:

1. A sheet mounting mechanism comprising a drum; a pair of clamps, each having a portion protruding through a slot in said drum, said portion including a toothed section extending over said drum; means for rocking one of said clamps for lifting the toothed portion thereof from engagement with said drum to permit insertion of one edge of the sheet to be mounted on said drum; means for rocking the other of said clamps for lifting the toothed portion thereof from engagement with said drum to permit insertion of the other edge of the sheet to be mounted on said drum; said means comprising a cam surface; a rod carrying said cam; and a lever connected to said rod.

2. A sheet mounting mechanism comprising a drum; a pair of clamps, each having a portion protruding through a slot in said drum, said portion including a toothed section extending over said drum; means for mechanically biassing the opposite ends of said clamps toward each other and the toothed portions into engagement with said drum; means for rocking one of said clamps for lifting the toothed portion thereof from engagement with said drum to permit insertion of one edge of the sheet to be mounted on said drum; and means for rocking the other of said clamps for lifting the toothed portion thereof from engagement with said drum to permit insertion of the other edge of the sheet to be mounted on said drum.

3. A sheet mounting mechanism comprising a drum; a plurality of clamps arranged in pairs, each having a portion protruding through a slot in said drum, said portion including a toothed section extending over said drum; and means for rocking corresponding clamps of each pair for lifting the toothed portions thereof from engagement with said drum to permit insertion of the edges of the sheet to be mounted on said drum.

4. A sheet mounting mechanism comprising a drum; a plurality of clamps arranged in pairs, each having a portion protruding through a slot in said drum, said portion including a toothed section extending over said drum; means for simultaneously rocking corresponding clamps of each pair for lifting the toothed portions thereof from engagement with said drum to permit insertion of the edges of the sheet to be mounted on said drum, said means comprising a cam surface; a rod carrying said cam; and a lever connected to said rod.

5. A sheet mounting mechanism comprising a drum; a plurality of clamps arranged in pairs, each having a portion protruding through a slot in said drum, said portion including a toothed section extending over said drum, the toothed portions of each pair being oppositely disposed with respect to each other; and means for mechanically biassing the opposite ends of said clamps toward each other and the toothed portions into engagement with the drum.

6. A sheet mounting mechanism comprising a drum; a plurality of clamps arranged in pairs, each having a portion protruding through a slot in said drum transversely of the drum axis, said portion including a toothed section extending over said drum, the toothed portions of each pair being oppositely disposed with respect to each other; and means for mechanically biassing the opposite ends of said clamps toward each other and the toothed portions into engagement with the drum.

7. A sheet mounting mechanism comprising a drum; a plurality of clamps arranged in pairs, each having a portion protruding through a slot in said drum, said portion including a toothed section extending over said drum, the toothed portions of each pair being oppositely disposed with respect to each other; a common pivot for each of said pairs of clamps; and means for mechanically biassing the opposite ends of said clamps toward each other and the toothed portions into engagement with the drum.

8. A sheet mounting mechanism comprising a drum; a plurality of clamps arranged in pairs, each having a portion protruding through a slot in said drum, said portion including a toothed section extending over said drum, the toothed portions of each pair being oppositely disposed with respect to each other; and a spring for mechanically biassing the opposite ends of said clamps toward each other and the toothed portions into engagement with the drum, the opposite ends of said spring being secured to said ends.

WILLIAM G. H. FINCH.